(12) United States Patent
Shylanski et al.

(10) Patent No.: US 9,644,952 B2
(45) Date of Patent: May 9, 2017

(54) METHOD FOR EVALUATING COMPONENT CALIBRATION IN MACHINE VISION VEHICLE WHEEL ALIGNMENT SYSTEM

(71) Applicant: Hunter Engineering Company, St. Louis, MO (US)

(72) Inventors: Mark S. Shylanski, University City, MO (US); Daniel R. Dorrance, Ballwin, MO (US); Bruce E. Bernard, St. Charles, MO (US); Thomas J. Golab, St. Peters, MO (US); Michael T. Stieff, Wentzville, MO (US); James W. McClenahan, St. Louis, MO (US); J. Kaleb Silver, St. Peters, MO (US); Timothy A. Strege, Sunset Hills, MO (US); Nicholas J. Colarelli, III, Creve Coeur, MO (US)

(73) Assignee: Hunter Engineering Company, St. Louis, MO (US)

( * ) Notice: Subject to any disclaimer, the term of this patent is extended or adjusted under 35 U.S.C. 154(b) by 916 days.

(21) Appl. No.: 13/830,867

(22) Filed: Mar. 14, 2013

(65) Prior Publication Data

US 2014/0111645 A1 Apr. 24, 2014

Related U.S. Application Data

(60) Provisional application No. 61/715,606, filed on Oct. 18, 2012, provisional application No. 61/762,418, (Continued)

(51) Int. Cl.
*G01B 11/27* (2006.01)
*G06T 7/00* (2017.01)
*G01B 11/275* (2006.01)

(52) U.S. Cl.
CPC ............ *G01B 11/27* (2013.01); *G01B 11/275* (2013.01); *G01B 11/2755* (2013.01); (Continued)

(58) Field of Classification Search
CPC .......................... G01B 11/275; G01B 11/2755
See application file for complete search history.

(56) References Cited

U.S. PATENT DOCUMENTS 4,239,389 A * 12/1980 Hollandsworth ...... G01B 11/26
33/288
4,319,838 A * 3/1982 Grossman .......... G01B 11/2755
33/288

(Continued)

OTHER PUBLICATIONS

International Preliminary Report on Patentability of corresponding application PCT/US2013/065361 issued Apr. 21, 2015.

*Primary Examiner* — David N Werner
(74) *Attorney, Agent, or Firm* — Polster, Lieder, Woodruff & Lucchesi, LC

(57) ABSTRACT

A process for calibrating and evaluating a machine-vision vehicle wheel alignment system having front and rear imaging components associated with each of the left and right sides of a vehicle support structure. Each pair of imaging components defines a front and rear field of view, with a common overlapping region associated with each respective side of the vehicle support structure. Optical targets disposed within each of the overlapping field of view regions are observed by the imaging components to establish performance ratings for the system as a whole, for groups of components within the system, and for individual components within the system.

31 Claims, 3 Drawing Sheets

Related U.S. Application Data filed on Feb. 8, 2013, provisional application No. 61/777,421, filed on Mar. 12, 2013.

(52) U.S. Cl.
CPC ............ *G06T 7/002* (2013.01); *G06T 7/0004* (2013.01); *G06T 7/0006* (2013.01); *G06T 7/0022* (2013.01); *G06T 7/0024* (2013.01); *G06T 7/0026* (2013.01); *G06T 7/0028* (2013.01); *G06T 7/0042* (2013.01); *G01B 2210/12* (2013.01); *G01B 2210/143* (2013.01); *G01B 2210/303* (2013.01); *G06T 2207/10012* (2013.01); *G06T 2207/30164* (2013.01)

(56) References Cited

U.S. PATENT DOCUMENTS

| | | | |
|---|---|---|---|
| 4,341,468 A * | 7/1982 | Hollandsworth .. | G01B 11/2755 33/228 |
| 4,629,317 A * | 12/1986 | January ............... | G01B 11/275 33/203.18 |
| 4,854,702 A * | 8/1989 | Stieff ................... | G01B 11/275 33/288 |
| 5,488,472 A * | 1/1996 | January .............. | G01B 11/2755 33/288 |
| 5,598,358 A * | 1/1997 | Gender .............. | G01B 11/2755 33/203.18 |
| 5,675,515 A * | 10/1997 | January ............... | G01B 11/275 356/139.09 |
| 5,809,658 A * | 9/1998 | Jackson ............. | G01B 11/2755 33/203.18 |
| 6,064,750 A * | 5/2000 | January ............... | G01B 11/2755 33/203.18 |
| 6,134,792 A | 10/2000 | January | |
| 6,219,134 B1 | 4/2001 | Voeller et al. | |
| 6,298,284 B1 * | 10/2001 | Burns, Jr. ............ | G01B 11/275 356/139 |
| 6,894,771 B1 * | 5/2005 | Dorrance ............ | G01B 11/2755 33/203.18 |
| 7,089,776 B2 * | 8/2006 | Dale, Jr. .............. | G01B 11/275 33/203.18 |
| 7,164,472 B2 * | 1/2007 | Dorrance ............... | G01C 11/04 356/139.03 |
| 7,453,559 B2 | 11/2008 | Dorrance et al. | |
| 7,583,372 B2 * | 9/2009 | Shylanski .......... | G01B 11/2755 356/139.09 |
| 7,640,673 B2 * | 1/2010 | Jackson ............. | G01B 11/2755 33/203.18 |
| 8,215,023 B2 | 7/2012 | Stieff et al. | |
| 2006/0090356 A1 * | 5/2006 | Stieff ................. | G01B 11/2755 33/288 |
| 2006/0227567 A1 * | 10/2006 | Voeller ............... | G01B 11/2755 362/512 |
| 2006/0279728 A1 | 12/2006 | Dorrance et al. | |
| 2008/0209744 A1 * | 9/2008 | Stieff ................. | G01B 11/2755 33/203.18 |
| 2010/0098324 A1 * | 4/2010 | Fujieda .................. | B25J 9/1697 382/154 |
| 2011/0040443 A1 * | 2/2011 | Brauer ............... | G01B 11/2755 701/31.4 |
| 2011/0316979 A1 | 12/2011 | Stieff et al. | |
| 2013/0271574 A1 * | 10/2013 | Dorrance ................ | H04N 7/18 348/46 |

\* cited by examiner

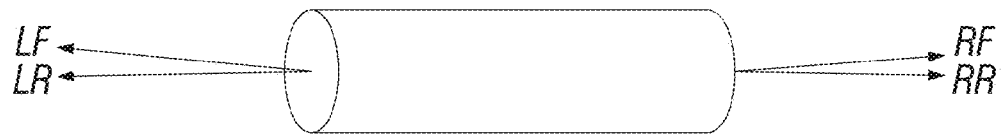
FIG. 3
FIG. 4
|   | 0 | 1 | 2 | 3 |
|---|---|---|---|---|
| 0 | - | A | B | C |
| 1 | A | - | D | E |
| 2 | B | D | - | F |
| 3 | C | E | F | - |
FIG. 5
|   | 0 | 1 | 2 | 3 |
|---|---|---|---|---|
| 0 | - | L | L | L |
| 1 | L | - | s | S |
| 2 | L | S | - | S |
| 3 | L | S | s | - |
FIG. 6
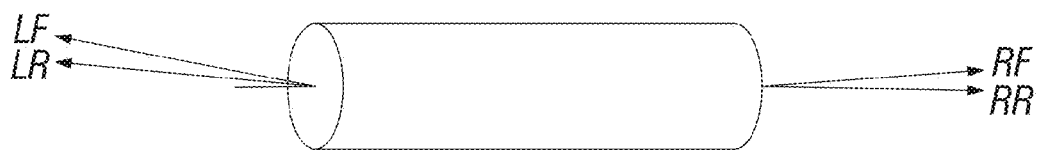
FIG. 7

METHOD FOR EVALUATING COMPONENT CALIBRATION IN MACHINE VISION VEHICLE WHEEL ALIGNMENT SYSTEM

CROSS-REFERENCE TO RELATED APPLICATIONS

The present application is related to, and claims priority from, U.S. Provisional Patent Application Ser. No. 61/715,606 filed Oct. 18, 2012, which is herein incorporated by reference.

The present application is further related to, and claims priority from, U.S. Provisional Patent Application Ser. No. 61/762,418 filed on Feb. 8, 2013, which is herein incorporated by reference.

The present application is further related to, and claims priority from, U.S. Provisional Patent Application Ser. No. 61/777,421 filed on Mar. 12, 2013, which is herein incorporated by reference.

STATEMENT REGARDING FEDERALLY SPONSORED RESEARCH

Not Applicable.

BACKGROUND OF THE INVENTION

The present application is related to machine vision vehicle service systems, such as a vehicle wheel alignment system, and in particular, to methods for determining the physical relationship between camera coordinate systems of multiple cameras having overlapping fields of view, to methods for identifying changes in optical components of the machine vision vehicle service system after calibration, and to methods for evaluating in total, the optical performance of a machine vision vehicle service system, the optical performance of groups of imaging components within the machine vision vehicle service system, and the optical performance of individual imaging components.

Machine vision vehicle wheel alignment systems utilize imaging sensors or cameras to measure the position and attitude of targets mounted within observable fields of view. These targets may be mounted to individual wheels of a vehicle, to components or structures associated with a vehicle, or to fixtures or devices utilized for calibration purposes. As used herein, the term "camera" may be used interchangeably with "imaging sensor" and "imager". The vehicle wheel alignment systems are configured to process the target images to determine, for each observed target, a target position and attitude, expressed in a coordinate system associated with the observing camera. In order for the vehicle wheel alignment system to complete a computation of vehicle alignment angles involving multiple wheels of the vehicle, knowledge of the physical relationships between each of the observing camera coordinate systems is required.

Typically, the cameras of a machine vision vehicle wheel alignment system are organized as a left camera assembly and a right camera assembly (each disposed to observe opposite sides (left and right) of a vehicle longitudinal centerline). In some configurations, one camera assembly is mounted to each end of a camera crossbeam that is supported by a mounting structure. Alternatively, each camera assembly is disposed in an independent pedestal, with a field of view directed at the associated side of a vehicle. In a four-camera configuration, each camera assembly includes a first camera, referred to as a "front camera" that is configured with a field of view to acquire images of a target mounted on a front wheel of the vehicle, and a second camera, referred to as a "rear camera" that is configured with a field of view to acquire images of a target mounted on a rear wheel of the vehicle on the same side as the front wheel observed by the first camera. Alternative configurations may only utilize two cameras, one in each camera assembly, and each of which is configured to acquire images of targets mounted on both the front and rear wheels of the vehicle.

Within a four-camera configuration, the relationship between the two cameras mounted in a camera assembly is called the rear-to-front cross transform. Traditionally, this relationship is established and measured in a factory at the time of assembly, and is unchanged during the operational life of the camera assembly. The process for establishing the relationship is commonly referred to as rear-to-front cross-calibration, and the resulting rear-to-front cross transform is stored in non-volatile memory within one or both cameras of the two-camera assembly. Because the rear-to-front relationships and cross transforms were set at the factory, field repairs of a failed camera in a machine vision alignment system with a four-camera configuration necessarily required replacement of the entire two-camera assembly instead of merely replacing an individual failed camera.

The computation of vehicle wheel alignment angles requires knowledge of the physical relationships between all of the cameras utilized by a machine vision vehicle wheel alignment system, as well as the relationship between the cameras and the surface of the vehicle lift or "runway" on which the vehicle is resting. Although rear-to-front relationships were determined in the factory, the remaining relationships were determined at the vehicle service site in a process referred to as "field calibration", such as shown in U.S. Pat. No. 7,453,559 to Dorrance et al. herein incorporated by reference.

The process of calibrating a machine vision vehicle wheel aligner usually involves a special procedure executed by a service technician and directed by the computer software of the aligner's "console" computer. This procedure requires the computer to record a series of observations of targets mounted to a portable fixture, such as a calibration fixture, placed in a series of positions on the alignment runway or vehicle support surface.

The fixture is a stand that supports a long bar horizontally across the runway or vehicle support surface. Near each end of the fixture is a saddle-like bearing that allows the horizontal bar to rotate around a horizontal axis. At each ends of the rotating bar is a socket. The presence of these sockets allows the mounting of a machine vision target on each end of the bar, such that a target is disposed within the field of view of an associated camera assembly on each respective side of the runway.

Each camera assembly is pointed so that the cameras collectively view a volume of space that runs along each side of the runway. The collective field-of-view of the left camera assembly does not overlap with the collective field-of-view of the right camera assembly, however, some degree of overlap is present for the fields of view of the front and rear cameras on a common side of the runway. During calibration procedures, the calibration fixture provides a physical connection between a target that is visible within the field of view a left side camera assembly and a target that is visible within the non-overlapping field of view of a right side camera assembly. When a series of observations are gathered involving a variety of calibration bar orientations, positions, or rotations, there is sufficient information to mathematically estimate a transform between camera assemblies for viewing the left and right sides of a vehicle, and cameras for viewing front and rear wheels of a vehicle, each of which may have non-overlapping fields of view.

The relationship between cameras and the runway surface can be measured by taking observations of the calibration fixture standing in a front axle area of the runway plus observations of the same fixture standing in a rear axle area of the runway surface. The observations allow the computation of the relative heights of the points where the calibration fixture was supported on the runway surface, which can lead to knowledge of the orientation of a "runway plane" relative to the coordinate system of a master camera.

After observations are gathered, a mathematical algorithm is executed by the alignment software that produces an estimate of physical relationships between certain pairs of cameras and an estimate of the physical relationship between a camera and the runway surface. These physical relationships between cameras or between a camera and the runway are often called "transforms". The set of observations must provide the computer with sufficient evidence for it to be able to unambiguously determine those transforms needed to complete the geometric information necessary to compute vehicle wheel alignment angles.

The traditional field calibration procedure for a four camera vehicle wheel aligner determines the transform between the right front camera and the left front camera, plus the transform between the left front camera and the runway. The observation set needed to compute these transforms involves a series of calibration fixture positions in the front axle area of the runway surface, plus a series of calibration fixture positions in the rear area of the runway surface. There are front observations seen only by front cameras plus rear observations seen only by rear cameras. Computation of the full set of inter-camera relationships relies upon the front-to-rear transforms for the right and left camera assemblies that were established at the factory during manufacture of the camera assemblies.

Accordingly, it would be advantageous to provide a process of field calibration for a four-camera vehicle wheel aligner which enables the rear-to-front relationships between the two cameras in an individual camera assembly to be determined at the vehicle service site, enabling in the field replacement of a single defective camera, and eliminating the need to replace an entire camera assembly.

The transforms which are determined from the calibration procedures remain valid so long as the physical relationships between the various components (i.e. imaging sensors) do not change, and so long as the optical properties of the elements comprising the components (i.e. targets, lenses, imaging sensor arrays, etc.) are not altered in some way. Accordingly, it would be advantageous to provide a method by which changes in optical components of the machine vision vehicle service system which occur after calibration has been completed may be identified. It would further be advantageous to provide a method by which the overall optical performance of a machine vision vehicle service system could be evaluated, as well as the optical performance of groups of imaging components within the machine vision vehicle service system or even of individual imaging components themselves.

BRIEF SUMMARY OF THE INVENTION

The present disclosure sets forth a comprehensive process of field calibration for a multi-camera machine vision vehicle wheel alignment system to establish a set of coordinate system transforms between individual cameras and the vehicle supporting surface. The set of coordinate system transformations are optimized together during an inclusive optimization process, distributing and minimizing the effects of measurement errors as well as errors introduced by camera optics.

In a further embodiment, the present disclosure sets forth a process of field calibration for a four-camera machine vision vehicle wheel alignment system which enables a rear-to-front relationship and transform between two cameras in an individual camera assembly disposed to view one side of a vehicle, to be determined at a vehicle service site, enabling in field replacement of a single defective camera within the individual camera assembly, or updating of previously determined relationships and transforms to account for shifts or changes in the physical structure of the camera assembly over time, and eliminating the need to replace an entire camera assembly as was previously necessary to maintain a factory-established rear-to-front transform.

In a further embodiment, the present disclosure sets forth a process for evaluating a machine-vision vehicle wheel alignment system having front and rear imaging components associated with each of the left and right sides of a vehicle support structure. Each pair of imaging components defines a front and rear field of view having an overlapping region. Optical targets disposed within each of the overlapping field of view regions are observed by the imaging components to establish performance ratings for the system as a whole, for groups of components within the system, and for individual components within the system.

In a further embodiment, the present disclosure sets forth a process for evaluating a machine vision vehicle wheel alignment system having front and rear imaging components associated with each of the left and right sides of a vehicle support structure. Each pair of imaging components defines a front and rear field of view having an overlapping region. Optical targets disposed within each of the overlapping field of view regions are observed by the imaging components to detect changes in one or more optical components of the system occurring after the system has been calibrated for use and/or to detect the presence of defective components.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3 is a representation of a calibration fixture together with axis of rotation (AOR) vectors of left and right optical targets observed by four cameras (2 per side) in a substantially problem-free machine vision vehicle service system;

FIG. 4 is a representation of a calibration fixture similar to FIG. 3, in a machine vision vehicle service system wherein the left front camera component has been displaced after calibration;

FIG. 5 is a table representing the angular differences between each observed AOR for a calibration fixture such as shown in FIG. 3;

FIG. 6 is a table representing the relative size of angular differences between each observed AOR for a calibration fixture such as shown in FIG. 3, wherein the left-front (LF) camera component has been moved after calibration; and FIG. 7 is a representation of a calibration fixture together with axis of rotation (AOR) vectors of left and right optical targets observed by four cameras (2 per side), wherein a problem is associated with one of the optical targets.

Corresponding reference numerals indicate corresponding parts throughout the several figures of the drawings. It is to be understood that the drawings are for illustrating the concepts set forth in the present disclosure and are not to scale.

Figure 1:
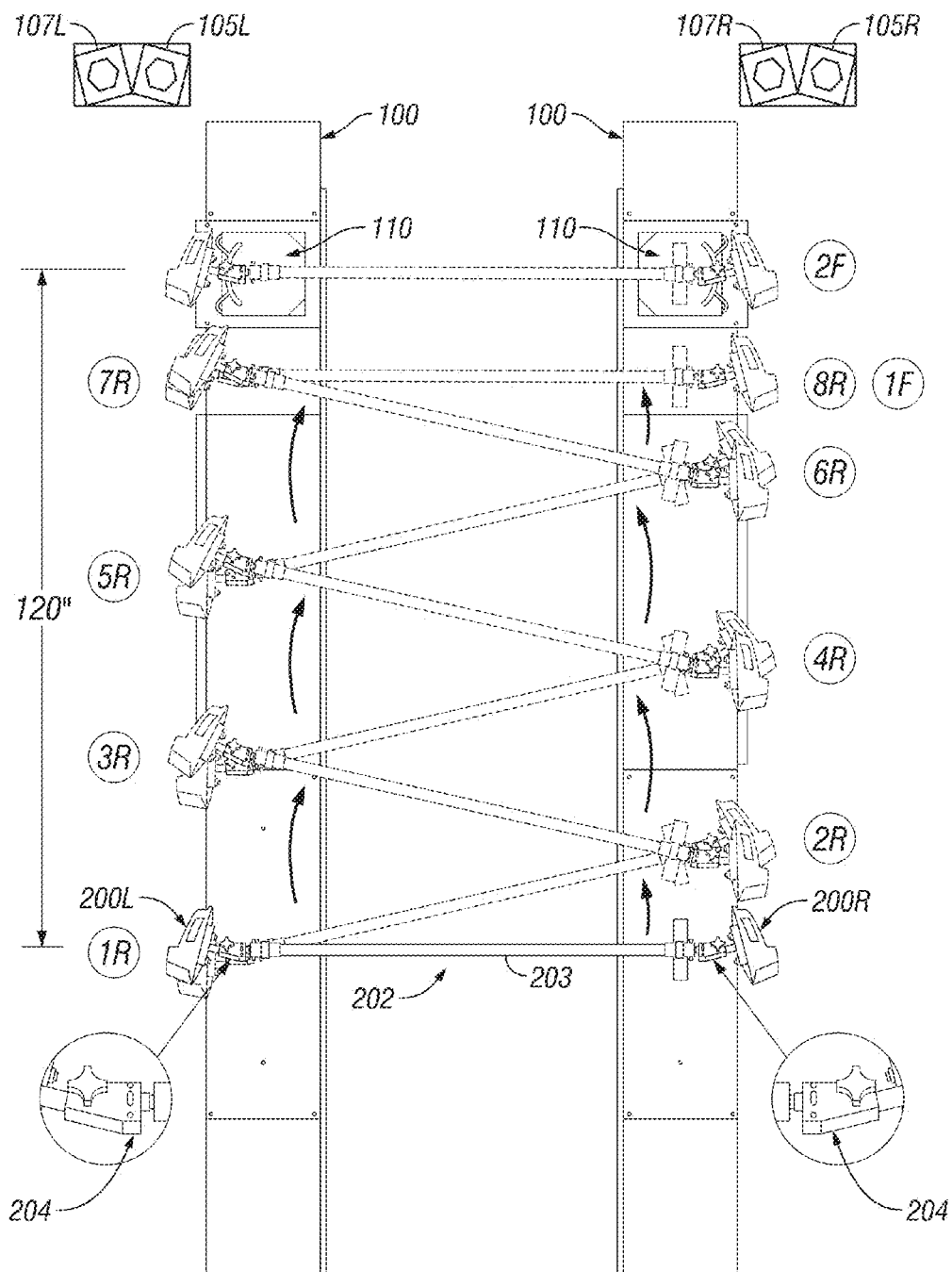
FIG. 1 is a top view of a vehicle service bay, illustrating the movement sequence for a calibration bar and associated optical targets during a field calibration procedure of the present disclosure.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

For purposes of this disclosure, it will be understood that the machine vision vehicle service system is described in the context of a vehicle wheel alignment system, and is configured with at least four individual camera components, arranged in a left-side front/rear and right-side front/rear configuration, such that two camera components in an assembly have fields of view along the left side of an associated vehicle support surface, runway, or rack (one generally aligned towards a front-wheel position, and one generally aligned towards a rear-wheel position for vehicles disposed on the vehicle support runway), and two camera components have similar fields of view along the right side of the associated vehicle support surface, runway or rack.

Figure 2:
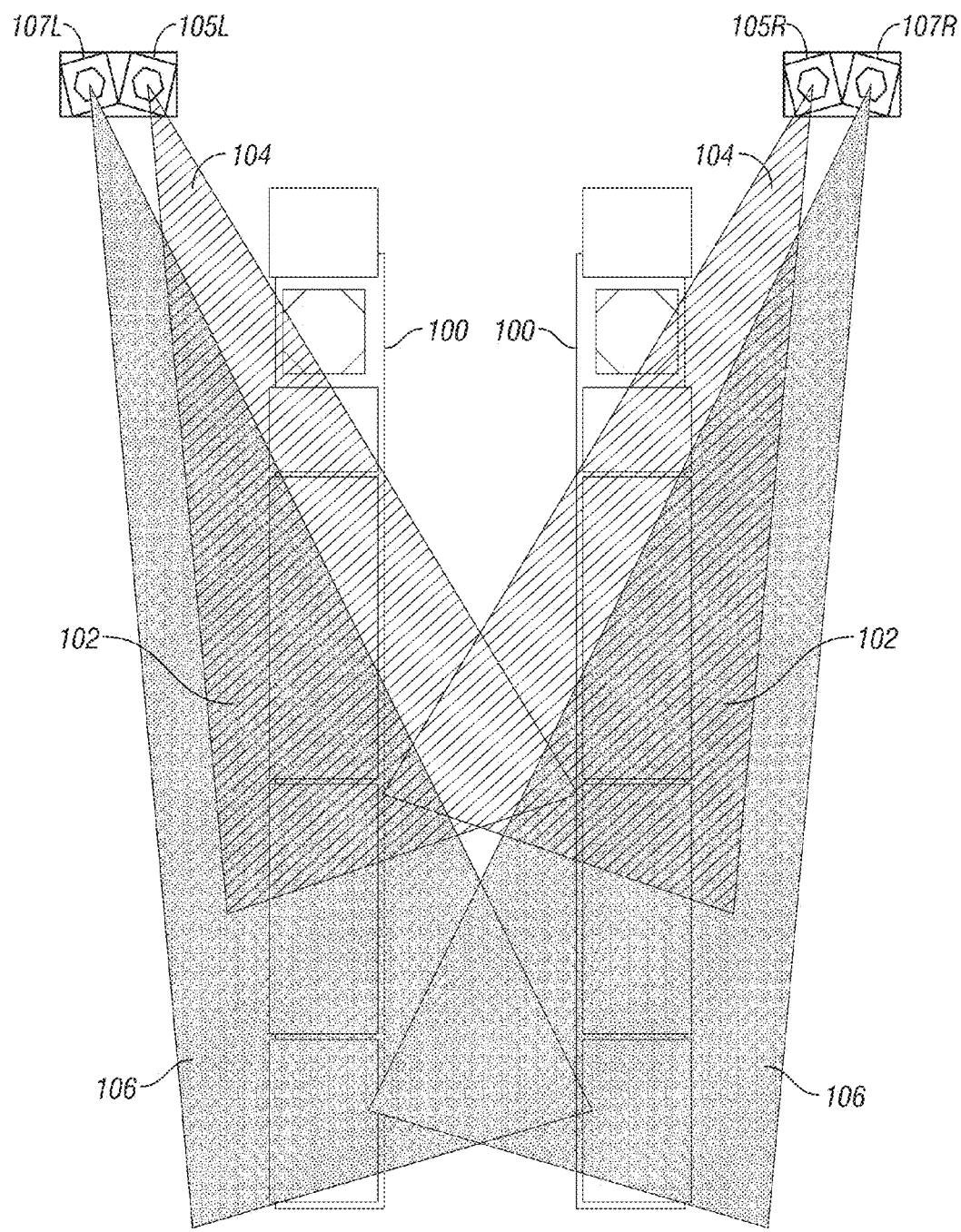
FIG. 2 is a top plan view of a vehicle support structure, illustrating exemplary overlapping fields of view from a set of observing front and rear cameras associated with the left and right runways.

Turning to the Figures, and to FIGS. 1 and 2 in particular, a sequence of steps in an exemplary field calibration procedure of the present disclosure for use in determining all necessary relationship transforms for a four-camera machine vision vehicle wheel alignment system is shown. The observation set for the field calibration procedure involves observations near the front axle area of the runway or other vehicle support surface 100, observations near the rear axle area of the runway 100, and observations at points in between in a region 102 in which the fields of view 104 of the front cameras 105L, 105R and the fields of view 106 of the rear cameras 107L, 107R of each camera assembly overlap on each side of the vehicle support surface longitudinal centerline. The resulting images are then processed to determine and optimize together all of the relationships and transforms between the individual cameras 105, 107 and runway surface 100, enabling any measurement errors to be distributed throughout the entire system and minimized. In addition, by acquiring multiple images of an optical target 200 at different positions within the field of view 104, 106 of each camera 105, 107, the processing and optimization procedures may minimize the effect of localized errors introduced by the optical elements (i.e., lenses) associated with each camera 105, 107, and which may affect the observed images within only a small portion of a camera's field of view 104, 106.

As in a traditional field calibration procedure, when a calibration fixture 202 is disposed in the vehicle front axle region of the support surface or runway 100, optical target positions are only measured by the front cameras 105L, 105R. When the fixture in the vehicle rear axle region of the support surface or runway 100, optical target positions are only measured by the rear cameras 107L, 107R. Although the optical targets 200L, 200R may lie within the field of view of a front camera 105, due to distance, focus, resolution, etc., rear measurements are only acquired by the rear cameras 107. With the field calibration procedure of the present disclosure, the observation set further includes observations with the calibration fixture 202 near the longitudinal middle portion of the vehicle support surface or runway 100, where the position of each optical target 200L, 200R on the calibration bar 202 can be simultaneously observed and measured by both a front camera 105 and a rear camera 107 in a camera assembly, i.e., in a region 102 of overlapping fields of view for a front and rear cameras. The presence of such observations provides information that makes it possible for a field calibration algorithm of the present disclosure to estimate the transform relationships between front and rear cameras, along with the other relationships such as with the runway or vehicle support surface 100.

The resulting set of observations, combined with a knowledge of the geometric relationships between the optical targets 200L and 200R as established by the calibration bar 202, provide an over-determined set of simultaneous equations to be solved by the field calibration algorithm. Knowledge of the statistical nature of the noise in the raw observations is employed to provide the most reliable statistical performance in the resulting algorithmic solution. Inherent in the field calibration procedure is the benefit to obtaining a sufficient variety of observations of the optical targets 200L, 200R along the length of the runway 100 to enable the calibration algorithm to achieve a high quality solution.

Specifically, the field calibration algorithms compute the inter-camera transforms and estimates of the spatial relationships between the various cameras 105, 107 to establish a characterization dataset for the alignment system via an iterative technique based on the Levenberg-Marquardt algorithm. A rough estimate of the spatial relationships is used as a seed value for the solution, and the various solution parameters are adjusted during a trial-and-error search for the solution that minimizes the disagreement posed by applying optical target positions and orientations observed during the field calibration procedure to equations representing the known geometry of the calibration fixture 202 and the vehicle support structure, runway, or service area set up. At each step of the optimization, the overall disagreement is expressed as a residue computed as the sum of the squares of weighted error terms. Each error term represents the angle or distance by which an equation representing known geometric relationships fails to balance when it is fed values from the set of observations.

In one embodiment, the field calibration procedure involves moving the calibration fixture 202, or any other suitable fixture for supporting the targets in the necessary positions, to a variety of locations within the fields of view 104, 106 of the cameras 105, 107 in order to capture images of the optical targets 200 mounted onto the calibration fixture 202 (observations). Because the calibration fixture 202 can be bulky and heavy, a minimization of operator effort is achieved by defining procedures that minimize the number of times the calibration fixture 202 must be moved, and the difficulty in making such movements. For example, a relatively high amount of operator effort is required to move the calibration fixture directly between the front axle area of the runway 100 and the rear axle area. On the other hand, it is relatively easy to execute a movement of the calibration fixture 202 such that one end of the calibration fixture continues standing on the same region of the runway 100 while the opposite end of the fixture is moved longitudinally along the runway 100, i.e., a pivoting and stepping movement.

In one embodiment, a field calibration procedure of the present disclosure begins with the calibration fixture 202, with mounted optical targets 202L and 202R, placed straight across an empty runway 100 in the rear axle area, as shown at 1R in FIG. 1. The rear axle area generally refers to the portion of the runway 100 in which the rear axle of a vehicle would be present during a vehicle wheel alignment measurement. As seen in FIG. 1, the field calibration procedure requires repeatedly taking a series of observations and then moving the calibration fixture 202 to a new position along the runway through a sequence of alternating pivoting movements of each lateral end, as denoted by the arrows and locations 2R, 3R, 4R, 5R, 6R, 7R, 8R, 1F, and 2F shown in FIG. 1.

In one embodiment, the calibration fixture 202 includes a transverse bar 203 which is rotatable about an axis, and is adapted with a fitting 204 at each opposing end, to receive an optical target 200. With this calibration fixture 202, each local series of observations involves capturing a series of images of the optical targets 202L, 202R mounted on each side of the calibration bar 202 at different rotational attitudes or orientations with the cameras 105, 107. Preferably, at each location, at least four images are acquired of each optical target 202L, 202R, with the optical targets at a different rotational attitude in each image. Each collection of images plays a role analogous to the execution of a sensor runout compensation procedure utilized during the alignment of a vehicle, and which is described in U.S. Pat. No. 6,134,792 to January and in U.S. Pat. No. 6,219,134 to Voeller et al., both of which are herein incorporated by reference. Such a runout compensation procedure allows the computation of the direction and position of an axis-of-rotation of the calibration bar 202.

Runout compensation math is applied to the acquired images of a given optical target 200 to produce an axis-of-rotation and the coordinates of a point where the axis-of-rotation of the optical target 200 pierces a reference plane on the target (i.e. a "piercing point"), as is described in U.S. Pat. No. 8,215,023 B2 to Stieff et al., which is herein incorporated by reference. For each compensation action, error terms are generated based on the angular disagreement between the axis-of-rotation (AOR) for the left target 202L and the axis-of-rotation for the right target 202R. The compensation action also produces error terms based on the positional offsets by which the solution appears to represent the presence of a shearing or "error-of-closure" on the calibration fixture. Finally, the compensation action also may produce an error term based on how well the apparent inter-target distance agrees with the average of such values over a series of compensation actions.

The values obtained for the optical target piercing points and AORs at each observed position of the calibration fixture 202 may be further utilized to determine a measure of vehicle support surface or runway 100 levelness between points on the runway surface, by comparing the piercing points and AOR values for the optical target on one end of the calibration fixture 202 with the values for the target on the opposite end of the calibration fixture. By comparing the values at multiple positions of the calibration fixture along the length of the vehicle support surface or runway 100, a representation of the levelness of the vehicle support surface or runway from side to side can be obtained over the length of the vehicle support surface or runway 100. The runway levelness representation may be stored by the vehicle service system and subsequently utilized during vehicle measurement procedures to compensate measurements for any observed left to right deviations in the vehicle support surface or runway 100 from a level surface.

At some of the calibration fixture positions on the vehicle support surface or runway 100 during the field calibration procedure, each target 200 is observed by both a rear camera 107 and a front camera 105 in a left or right camera assembly at the same time, i.e. is within the region 102 of overlapping front and rear fields of view 104, 106. In such cases, additional error terms for driving the optimization are generated based on any disagreement between the front and rear cameras 105, 107 concerning the position and orientation of the observed optical target 200. (Such error terms help the optimization to infer the relationships from rear cameras 107 to front cameras 105.)

In one embodiment, a solution for the optimization employed within field calibration algorithm is an array of floating point numbers representing one inter-target distance and three sets of homogeneous coordinate transforms. The inter-target distance is the distance along the axis-of-rotation of the calibration fixture 202, extending from a point on the optical target 200L mounted on the left end of the calibration fixture to a point on the optical target 200R mounted on the right. Each of the three coordinate transforms is composed of the rotation and translation needed to transform from the coordinate frame of one camera to another in a four-camera system. The three mappings encoded in the optimization's solution include at least: (1) the transform from the right front camera 105R coordinates to the left front camera 105L coordinates; (2) the transform from the left rear camera 107L coordinates to the left front camera coordinates 107R; and (3) the transform from the right rear camera 107R coordinates to the right front camera 105R coordinates. All other inter-camera transforms are derived from the above three as needed during the alignment of a vehicle.

By providing a method for computing each of these transforms from a set of observed images acquired by the cameras 105, 107, identification and replacement of individual cameras in each left and right camera assembly becomes possible. Previously, if a single camera 105, 107 in a camera assembly developed a fault or defect, the entire camera assembly, including both the front and rear cameras, was required to be returned to the manufacturer for replacement and re-calibration using specialized procedures. Using the method of the present disclosure, a single front or rear camera within a camera assembly can be replaced in the field, and a new set of transforms determined and stored in association with the new camera and altered mountings within the camera assembly. The methods of the present disclosure may further be utilized to verify the accuracy of previously stored transforms for a set of cameras, as well as to provide a set of replacement transforms for the set of cameras, as may be necessary from time to time to account for shifts or changes in the physical structure of a camera assembly over time.

The field calibration algorithm of the present disclosure may further produce a transform from the left front camera 105L coordinate system to a runway coordinate system. This transform is not part of the optimization solution; it is computed directly from the optimization solution, observations from the field calibration procedure, and the known geometry of the calibration fixture 202 and vehicle support surface, runway, or service bay.

While described above in connection with rotation of the transverse bar 203 and associated optical targets 200 of the calibration fixture 202 at various positions along the vehicle support surface 100, it will be recognize that the calibration fixture 202 is not required to provide for rotational movement of the associated optical targets 200. The methods and procedures of the present disclosure for field calibration and optimization provide increased accuracy and precision when provided with additional data. Sufficient data is available to produce the various transforms and error minimization benefits of the present disclosure from images optical targets 200 which remain stationary with respect to the calibration fixture 202 as it is displaced to multiple positions within the various fields of view 102, 104, and 106.

The movements of the calibration fixture 202 during one embodiment of the field calibration procedure of the present invention can be seen with reference to FIG. 1. The field calibration procedure generally requires movement of the calibration fixture 202 along the runway 100 by leaving one end of the calibration fixture in place as a pivot point while the operator advances (displaced) the other end of the calibration fixture 202 longitudinally along the runway or vehicle support surface 100 a short distance, preferably in the range of 20 to 40 inches, as shown by the arrows in the Figure. Once one end of the calibration fixture 202 is repositioned, a new series of images is acquired, which may or may not involve rotation of a transverse bar 203 upon which associated optical targets 200 are mounted, and the movement process is repeated for the opposite end of the calibration fixture 202 (previously the pivot point) to advance (displace) it to a new position which is preferably not in transverse alignment across the runway surface 100. As the operator continues to alternately advance the ends of the calibration fixture 202, the calibration fixture is effectively "walked" from the rear axle area of the runway or vehicle support surface 100 to the front axle area in a series of alternating "steps".

With typical service area layouts, the procedure may walk the calibration bar 202 from rear to front in seven steps, although a longer or shorter series of steps, either increasing or decreasing the total number of acquired image sets, is acceptable under appropriate conditions, so long as at least one set of images is acquired by each camera assembly (left and right side) in which the optical targets 200 are within the overlapping portion 102 of the fields of view of both the front and rear cameras in each assembly simultaneously, i.e., an optical target 200 on one side of the vehicle runway 100 is within an overlapping region 102 for the fields of view of the associated front and rear cameras 105, 107 in the camera assembly on that side of the vehicle runway.

In a further embodiment of the field calibration procedure of the present disclosure, the machine vision optical targets 200 mounted to the calibration fixture 202 are changed in response to the position of the calibration bar 202 on the vehicle runway 100. For example, during some observations in the rear axle area of the runway it is desirable to utilize the optical targets 200 that will be mounted on the rear wheels of a vehicle being aligned. Similarly, during some observations in the front axle area of the vehicle runway, it is desirable utilize different optical targets 200 that will be mounted on the front wheels of the vehicle during an alignment procedure. The specific point at which the optical targets 200 are exchanged during the procedure does not matter, so long as it is not during the acquisition of a set of images by the cameras 105, 107.

In one embodiment of the field calibration procedure of the present disclosure, a final observation of the optical targets 200 is acquired with the calibration fixture 202 resting directly on top of a set of steered wheel turn plates 110 disposed at the front end of the vehicle support surface or runway 100, at position 2F in FIG. 1. This facilitates scrutiny of the quality of the rolling surfaces of the runway 100. During the alignment of a vehicle, it is desirable that the vehicle can be observed rolling a short distance, in order to compute each wheel's axis-of-rotation. Vehicle alignment angle measurements of the greatest accuracy are likely to be obtained when the surfaces over which the vehicle is rolled closely approximates a perfectly planar surface. The observation of the field calibration procedure on the runway's steered wheel turn plates 110 facilitates comparing the relative heights (i.e. runway levelness) of several points on the runway surface 100 that will correspond to the starting and ending positions of vehicle front tire contact patches during the rolling runout compensation procedure that is part of a vehicle alignment. If the points do not lie very close to the overall runway plane determined by the calibration algorithm from the acquired sets of images, a warning can be displayed to the operator, suggesting that the runway rolling surface 100 is of low quality and may need repair or inspection.

Once the field calibration algorithms have computed all the inter-camera transforms and have estimated a runway plane from the acquired sets of images, the resulting characterization dataset can be used to produce a left-side and a right-side altitude estimate associated with each of the positions as the calibration fixture 202 was walked forward from the rear axle area of the vehicle support surface 100 to the front axle area. Interpolation between these data points can be used to identify sloping or bending conditions along the vehicle support surface 100.

Those of ordinary skill in the art will recognize that while the field calibration procedure and algorithms of the present disclosure have been presented in the context of a four-camera vehicle wheel alignment system, the procedures and algorithms provide an overall optimization of the wheel alignment system and runway, and may be utilized with systems having different numbers of cameras, such as a two-camera vehicle wheel alignment system, to produce useful information. For example, in a two-camera system, the procedures and algorithms provide an optimized left-to-right camera transform and a mapping of the runway surfaces to a high degree of accuracy.

Those of ordinary skill in the art will recognize that while the field calibration procedure and algorithms of the present disclosure have been described with the initial placement of the calibration fixture 202 at the rear-axle region of the vehicle runway or support surface 100, and with subsequent movements of the calibration fixture carried out during the procedure to move the calibration fixture towards a final placement position within the front-axle region of the vehicle runway, the procedure and algorithms may be adapted to accommodate a different initial placement position and movement sequence for the calibration fixture, so long as a sufficient number of images are acquired by each camera individually and within a region 102 of overlapping fields of view.

In a further embodiment of the present disclosure, a set of observations acquired after the initial calibration procedures have been completed may be utilized to establish a performance rating for: (a) the machine vision vehicle service system as a whole; (b) for groups of components within the system; and/or (c) for individual components within the system. The initial calibration may be implemented by any suitable method so long as at least a minimum number of spatial relationships between the various components, including the rear-to-front and left-to-right coordinate system transforms, are determined. Generally, once a machine vision vehicle service system is calibrated, the spatial relationships between the various camera components 105, 107, and the optical characteristics of the lenses and imaging elements, must remain unchanged during use. If these relationships and characteristics change during use, such as through the loosening of a camera mounting, or the displacement of a lens within a camera assembly, measurement errors will be introduced into the obtained results, and system performance will degrade.

The set of observations acquired for performance evaluation includes observations of the optical targets 200 mounted to the calibration fixture 202 disposed generally transversely across the associated vehicle support runway 100, in the vicinity of the support runway's longitudinal mid-point. The specific position and orientation of the calibration fixture 202 is not critical so long as the optical targets 200L and 200R which are positioned on the left and right ends of a calibration fixture respectively, can be simultaneously observed and measured by both a front camera 105 and a rear camera 107 in an associated-side camera assembly of the vehicle wheel alignment system. As shown by the exemplary fields of view in FIG. 2, the optical targets must be disposed within the region 102 of overlapping fields of view for the front and rear cameras 105, 107 on each side of the vehicle support structure to enable a complete evaluation of the system to be conducted. However, it will be recognized that a determination of performance ratings for some groups of components or for some individual components within the machine vision vehicle service system may only require the calibration fixture 202 to be positioned at a location within an observable field of view for those specific components (i.e. front cameras' combined field of view, rear cameras' combined field of view, left cameras' combined field of view, or the right cameras' combined field of view).

The initial observation set of images is acquired during a multi-point compensation procedure, wherein the optical targets 200L, 200R disposed on the opposite ends of the calibration fixture 202 are positioned in a sequence of rotational positions about the rotational axis of the calibration fixture. The observation set of images is processed by a suitably configured processing system associated with the machine vision vehicle service system to obtain an axis of rotation (AOR) vector representative of each of the optical targets 200 as observed by each camera 105, 107. Hence, as seen in FIGS. 3 and 4, a total of four AOR vectors are obtained, an AOR vector (LF) for the left front camera 105R observing the rotation of the left target 200L, an AOR vector (RF) for the right front camera 105R observing the rotation of the right target 200R, an AOR vector (LR) for the left rear camera 107L also observing the rotation of the left target 200L, and an AOR vector (RR) for the right rear camera 107R which is also observing the rotation of the right target 200R. FIG. 3 represents exemplary AOR vectors obtained from a machine vision vehicle service system which has been calibration and which is in good operating condition, while FIG. 4 represents exemplary AOR vectors obtained from a similar system which is in poor operating condition due to a problem associated with the left front camera component.

Once the four AOR vectors (LF, RF, LR, RR) are determined, the next step is to calculate the angles between each pair of AOR vectors. If all of the hardware, calibration procedures, and software (comp calculations) are working perfectly, the four AORs will be substantially parallel and the angles between them near zero, such as shown in FIG. 3. (This is ignoring some possible environmental factors.) Overall, for a four-camera system, there will be six unique pairs of AORs. The angles between each pair of AORs may be represented by the letters A-F, as seen in the table of FIG. 5.

The following data numerically illustrates the process of the present disclosure for evaluating the performance of a machine vision vehicle wheel alignment system by means of an example. The illustrated data is not intended to be limiting to the scope of the present disclosure in any sense. Initially, the machine vision vehicle wheel alignment system is calibrated by any suitable procedure. With the calibration fixture 202 and associated optical targets 200L, 200R disposed as described above, a set of observation from the camera components 105, 107 is processed to obtain the following exemplary AOR angular difference values:

|  |  | Angles: | | | |
| --- | --- | --- | --- | --- | --- |
|  |  | 0 (FL) | 1 (FR) | 2 (RL) | 3 (RR) |
| Original | 0 (FL) | 0 | 0.040 | 0.011 | 0.025 |
|  | 1 (FR) | 0.040 | 0 | 0.032 | 0.015 |
|  | 2 (RL) | 0.011 | 0.032 | 0 | 0.020 |
|  | 3 (RR) | 0.025 | 0.015 | 0.020 | 0 |

Max 0.040
Avg 0.024

Within this exemplary dataset of angular differences, a maximum observed value is 0.040 (and an average value is 0.024). This maximum observed value can be used as a measure of the overall quality or performance rating of the machine vision vehicle service system components and the calibration procedure results. This measure of overall quality or performance rating only applies to the current location of the calibration fixture 202 on the vehicle support surface 100 relative to the observing camera components 105, 107. Different values may be obtained if the process is repeated with the calibration fixture 202 at difference locations on the vehicle support surface 100, as each of the camera components 105, 107 may experience varying levels of image distortion effects over the associated observable fields of view 104, 106, which must be compensated for during the initial calibration procedures.

Following the calibration procedure and AOR determination above, an Rz component of the right side Rear-to-Front transform is altered by −0.100° to simulate movement or positional deviation of one of the right side camera components. Upon re-measurement of the optical targets 200L, 200R mounted to the calibration fixture 202 using the procedures set forth above, the resultant exemplary angles between the AORs are changed as follows:

|  | | Angles: | | | |
| --- | --- | --- | --- | --- | --- |
|  | | 0 | 1 | 2 | 3 |
| w/ 0.100 Rz change for right pair. | 0 | 0 | 0.041 | 0.010 | 0.074 |
|  | 1 | 0.041 | 0 | 0.031 | 0.115 |
|  | 2 | 0.010 | 0.031 | 0 | 0.084 |
|  | 3 | 0.074 | 0.115 | 0.084 | 0 |

In order to facilitate the calculations, the values obtained for the AORs for the right side camera components (1) and (3) are inverted before they are compared to the AORs for the left side camera components (0) and (2). This reverses the sign of the effects of the change in Rz without altering the numerical value. Consequently, instead of differences, the sums of results involving AORs (3) and (0) and AORs (3) and (2) are calculated. This results in numbers very close to 0.100 as shown below. The differences (and sums) are divergent, falling either very close to 0.100 or to 0.000, in excellent agreement with the expected results.

|  | | Diff or Sum: | | | |
| --- | --- | --- | --- | --- | --- |
|  | | 0 | 1 | 2 | 3 |
| Cam 3 is flipped rel to 0 and 2. Sum of 03 and 23. | 0 | 0 | 0.001 | −0.001 | 0.100 |
|  | 1 | 0.001 | 0 | −0.001 | 0.100 |
|  | 2 | −0.001 | −0.001 | 0 | 0.104 |
|  | 3 | 0.100 | 0.100 | 0.104 | 0 |

As is apparent from the difference or sum table above, for purposes of identifying which, if any, of the camera components has been physically altered (i.e., moved) since the machine vision vehicle wheel alignment system was calibrated, it is not necessary to compare the specific numerical values obtained by the angle calculations. Identifying information can be extracted by comparing the relative size of the calculated angles to identify relatively large and small difference values, i.e. those close to 0.100 and those close to 0.000.

For example, after evaluating the exemplary AOR vectors depicted in FIG. 4, it will be apparent that the difference or sum angles formed by comparing the (LF) AOR with all the other AORs will be near 0.100 (and hence designated as "Large" (L)). The angles formed by comparing every other pair of AORs will be near 0.000 (and hence designated as "small" (s)). As above, this assumes that some AOR vectors are inverted such that 180° becomes 0°. This result is illustrated in the table of FIG. 6, from which it becomes readily apparent which camera/lens assembly has moved. The procedure can be distilled down to the steps of, for each camera component, finding the minimum angle (or median angle, or both) between its AOR and the other three. The camera component with the largest value (L) is the one that has moved or changed since the machine vision vehicle service system was calibrated.

Detection of an alteration in the position of a camera component following calibration using this procedure relies upon several assumptions regarding the machine vision vehicle wheel alignment system:

First, the amount of movement of one of the camera components results in a change in the associated AOR which is larger than the normal measurement error. (Otherwise, the amount of movement is insignificant and there is no apparent issue with the set of cameras/lenses.)

Second, the calibration fixture is such that the Left and Right AOR along which the optical targets 200 are mounted are sufficiently parallel for a well calibrated system. (i.e., a good calibration fixture 202 is used.)

Third, the left and right optical targets 200L, 200R mounted to the calibration fixture 202 (either front- or rear-style optical targets) do not contribute significantly to the AOR differences. (i.e., good optical targets 200 are used.)

Fourth, the same calibration fixture 202 and optical targets 200 are used at calibration and at the time that the performance of the machine vision vehicle wheel alignment system is evaluated. However, it might be possible to substitute other good calibration fixtures and optical targets without much change in the results.

Not all of these assumptions need to be valid in order to collect valuable data and to characterize the machine vision vehicle wheel alignment system and its optical components.

As noted above, this procedure can be used to evaluate the performance of the entire machine vision vehicle wheel alignment system just after a calibration process is completed. For a "perfect" machine vision vehicle wheel alignment system (i.e., perfect cameras 105, 107, internal lenses, calibration bar 202, vehicle lift rack or runway surface 100, calibration results, computation results, etc.) all of the AORs will be parallel and the angles between them will be zero. The maximum value or average value of the resultant AOR comparison angles can be used as a numerical rating or measure of the overall performance of the machine vision vehicle wheel alignment system, including the quality of the calibration results. This is, however, only a measurement of the performance of the machine vision vehicle service system at one particular calibration bar location. A more complete performance evaluation can be conducted by repeating the procedures with the calibration bar 202 at different locations on the vehicle support runway 100.

If there are large errors present in the measurements of the AORs and the resultant difference angles, some the numerical angle values in the above table might not be considered as "small", rendering it difficult to easily identify a defective or damaged component. A baseline measurement of the AORs and the associated difference angles can be made at the same time as a field calibration of the machine vision vehicle service system is conduction, and subsequent deviations from these AORs and angles can be measured as different components of the system are varied or replaced.

In a second exemplary test of the present procedure, a machine vision vehicle wheel alignment system was initially calibrated, obtaining the following AOR difference values:

|  | | Angles: | | | |
| --- | --- | --- | --- | --- | --- |
|  | | 0 | 1 | 2 | 3 |
| Original | 0 | 0 | 0.109 | 0.020 | 0.430 |
|  | 1 | 0.109 | 0 | 0.090 | 0.338 |
|  | 2 | 0.020 | 0.090 | 0 | 0.417 |
|  | 3 | 0.430 | 0.338 | 0.417 | 0 |

Max 0.430
Avg 0.234

The maximum value of these difference angles is 0.430 (the average difference angle is 0.234), which represents a numerical measure of the overall quality of the system components and the calibration procedure results. The large values for the angles for the original measurements are a result of the particular procedures used in this exemplary test sequence. Specifically, the mounting for the right rear camera 107R was intentionally loosened in its mounting before the original AORs and angles were measured during calibration. The large values clearly indicate that this is not a good machine vision vehicle service system in its current state. Once calibrated, the right rear camera 107R was further moved by an unknown amount. Upon re-measurement of the optical targets 200 mounted to the calibration fixture 202 using the procedures set forth above, the difference angles between the AORs were found to have changed as follows:

|  |  | Angles: | | | |
|---|---|---|---|---|---|
|  |  | 0 | 1 | 2 | 3 |
| w/ Cam 3 (RR) moved | 0 | 0 | 0.106 | 0.018 | 0.348 |
|  | 1 | 0.106 | 0 | 0.090 | 0.281 |
|  | 2 | 0.018 | 0.090 | 0 | 0.342 |
|  | 3 | 0.348 | 0.281 | 0.342 | 0 |

The differences between the AOR values obtained after calibration and the AOR values obtained after the unknown movement of the right rear camera 107R are shown below:

|  | Differences: | | | |
|---|---|---|---|---|
|  | 0 | 1 | 2 | 3 |
| 0 | 0 | −0.003 | −0.003 | −0.083 |
| 1 | −0.003 | 0 | 0.000 | −0.057 |
| 2 | −0.003 | 0.000 | 0 | −0.075 |
| 3 | −0.083 | −0.057 | −0.075 | 0 |

The differences in the angles in the table, and in particular the relative large and small angles, clearly indicate that the right rear camera 107R (3) has moved and that the other three camera components present in the machine vision vehicle wheel alignment system have not.

In a third exemplary test of the present procedure, a machine vision vehicle wheel alignment system was initially calibrated, obtaining the following AOR difference values:

|  |  | Angles: | | | |
|---|---|---|---|---|---|
|  |  | 0 | 1 | 2 | 3 |
| Original | 0 | 0 | 0.031 | 0.022 | 0.010 |
|  | 1 | 0.031 | 0 | 0.009 | 0.021 |
|  | 2 | 0.022 | 0.009 | 0 | 0.013 |
|  | 3 | 0.010 | 0.021 | 0.013 | 0 |

Max 0.031
Avg 0.018

Subsequent to the calibration, the right rear camera 107R of the machine vision vehicle wheel alignment system was displaced from the position in which it was calibrated by loosening and subsequently re-tightening a set of associated mounting screws. This was intentionally carried out without any particular attention to detail, without attempting to avoid movement of other camera components, and without attempting to restore the right rear camera 107R to the exact previous position. Upon re-measurement of the optical targets 200 mounted to the calibration fixture 202 using the procedures set forth above, the difference angles between the AORs were observed to have changed as follows:

|  |  | Angles: | | | |
|---|---|---|---|---|---|
|  |  | 0 | 1 | 2 | 3 |
| w/ Cam 3 moved | 0 | 0 | 0.060 | 0.024 | 0.052 |
|  | 1 | 0.060 | 0 | 0.057 | 0.029 |
|  | 2 | 0.024 | 0.057 | 0 | 0.061 |
|  | 3 | 0.052 | 0.029 | 0.061 | 0 |

Max 0.061
Avg 0.047

The differences between the AOR values obtained after calibration and the AOR values obtained after the movement of the right rear camera component are shown below:

|  | Diffs: | | | |
|---|---|---|---|---|
|  | 0 | 1 | 2 | 3 |
| 0 | 0 | 0.029 | 0.002 | 0.042 |
| 1 | 0.029 | 0 | 0.047 | 0.008 |
| 2 | 0.002 | 0.047 | 0 | 0.048 |
| 3 | 0.042 | 0.008 | 0.048 | 0 |

It is apparent from a review of the difference angles that only the angle between the two left-side AORs (0) and (2) is virtually unchanged. The orientation of the right side camera components relative to the left side camera components has changed as is evident by the change in the angles for the Left-Front and Right-Front AORs (0-1), the Left-Front and Right-Rear AORs (0-3), and the Left-Rear and Right-Rear AORs (2-3). The values for the (0-3) and (2-3) differences are 0.042 and 0.048, respectively. The difference values between (0-1) and (0-3) are 0.029 and 0.008, respectively. Note that these sum to 0.037, which is nearly equal to the other angular changes.

The small change in the angles between the right-front camera (105R) and right-rear camera 107R can be explained by the fact that due to the procedures utilized, it is unknown how much the AOR angle actually changed during the process. It would be particularly advantageous if a camera component mounting can be loosened and then retighten without changing the relative orientation appreciably, as this would aid in field adjustments.

In general, the methods of the present disclosure for evaluating the performance of a machine vision vehicle service system can be further used to isolate and evaluate different individual components, or groups of components, of the system. For example, the left-side cameras 105L, 107L can be evaluated by comparing just the two left AORs from the LF and LR cameras. Not only does this isolate the left side camera components from the right side camera components, but it also eliminates any errors/contributions from the field Right-to-Left transforms. The same statement holds true for the right side cameras 105R, 107R as well as for the front cameras (105) and rear cameras (107)

The methods of the present disclosure are able to detect a variety of conditions associated with a machine vision vehicle wheel alignment system following calibration of the system. These include the identification of a pair of camera components (left or right) which have been subsequently removed and remounted, the detection of physical changes to the optical targets 200, or the mounting of an individual camera component or lens assembly, an identification of an incorrect rear-to-front transform, and an identification of incorrect left-side to right-side transforms.

The methods of the present disclosure for evaluating the performance of a machine vision vehicle service system can be expanded to evaluate additional elements of the machine vision vehicle service system. For example, once a combination of camera components 105, 107, optical targets 200, calibration fixture 202, and a vehicle support structure 100 has been assembled which achieves a desired performance rating, a baseline of AORs and angular differences can be established for this 'Gold Standard' system. Other elements and components, such as replacement camera components or replacement optical targets, can be substituted for the corresponding components in the 'Gold Standard' system and the resulting change in the performance rating evaluated. This procedure can be used to evaluate hardware components as well as software/algorithmic components to identify both defective and high precision components. These may include: (a) individual camera components and lens assemblies; (b) pairs of camera components; (c) rear-to-front transforms; (d) right-to-left transforms; (e) optical targets; (f) the effect of target characterizations; (g) calibration fixtures; (h) horizontal and vertical field-of-view issues; (i) environmental effects; and (j) vehicle support structures or racks.

For example, optical targets 200 utilized in a machine vision vehicle wheel alignment system may be evaluated by observing the general orientation of the determined AOR vectors relative to the longitudinal AOR of the calibration figures. As seen in FIG. 7, in a machine vision vehicle wheel alignment system having a "bad" target disposed on the left side of the calibration fixture will result in the determined AOR vectors obtained from the left camera components being arrayed about axis which is oriented at an angle relative to the calibration fixture AOR. In contrast, the determined AOR vectors shown in FIG. 3 for a machine vision vehicle wheel alignment system having "good" targets are generally arrayed about the calibration fixture AOR on each of the left and right sides.

Those skilled in the art will recognize that while the present disclosure sets forth and describes methods for bad component detection and for characterizing the performance of a machine vision vehicle service system as a whole, the performance of groups of components in such a system, or the performance of individual system components, by evaluating data related to the axis or rotation (AOR) observed for optical targets 200 by imaging components of the system, other data and/or measurements may be utilized together with, or in place of, the AOR data. For example, system performance may be characterized by evaluating or comparing other angular measurements, spatial positions, or planar surfaces which are either obtained from, or calculated from observed optical targets 200. As such, the present disclosure is not intended to be limited to procedures for the establishment of performance characteristics or component problem detection through only a comparison of observed optical target AORs.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for evaluating a machine vision vehicle wheel alignment measurement system having a plurality of camera components, each of said camera components having a stationary field of view for observing at least one optical target, comprising:
    disposing a set of optical targets within overlapping regions of the stationary fields of view for said plurality of camera components such that at least one optical target within said set of optical targets is observable by at least two camera components within said plurality of camera components;
    observing said set of optical targets with said plurality of camera components to acquire a set of images representative of said observed optical targets, said set of images including, for each observed optical target, at least two images acquired from separate camera components within said plurality of camera components;
    processing said set of images to identity, for each of said observing camera components, data representative of at least one feature associated with said observed optical targets;
    comparing said identified data from each of said observing camera components to establish at least one representation of performance for at least a single component of the machine vision vehicle wheel alignment measurement system; and
    wherein said single component may be an established calibration transform, a camera component, an optical target, a calibration fixture, or a vehicle support surface.

2. The method of claim 1 wherein said representation of performance is an identification of at least one defective component associated with the machine vision vehicle wheel alignment measurement system; and
    wherein said defective component may be an established calibration transform, a camera component, an optical target, a calibration fixture, or a vehicle support structure.

3. The method of claim 1 wherein said representation of performance is an indication of a change in a configuration associated with at least one camera component of the machine vision vehicle wheel alignment measurement system having occurred after a calibration procedure; and
    wherein said change in configuration is a change in a mounting position of said at least one camera component relative to another camera component, or a change in a configuration of one or more optical elements within said at least one camera component.

4. A method for evaluating a machine vision vehicle wheel alignment measurement system having at least four cameras including, for the left and right sides of a vehicle positioned on a vehicle support surface, a front camera with an associated field of view disposed to view a front wheel of the vehicle, and a rear camera with an associated field of view disposed to view a rear wheel of the vehicle, said rear camera associated field of view and said front camera associated field of view intersecting to define an overlapping region, comprising:

providing a fixture having identifiable features;

acquiring from said cameras disposed in a selected spatial configuration, a set of images of said identifiable features of said fixture disposed on said vehicle support surface at a plurality of positions within said fields of view, at least one of said plurality of positions disposed within said overlapping regions for said fields of view of said front and rear cameras on each side of the vehicle;

processing said set of acquired images to calibrate said plurality of cameras and said vehicle support surface associated with said machine vision wheel alignment measurement system;

repeating said step of acquiring to acquire from at least one of said cameras disposed in said selected spatial configuration, a second set of images while said fixture is disposed on said vehicle support surface at a position which is within the overlapping region of the fields of view associated with said front and rear cameras on each side of the vehicle support surface; and processing said second set of acquired images to establish a performance metric for said calibrated machine vision wheel alignment measurement system.

5. The method of claim 4 wherein said second set of images includes images acquired from each of said cameras, and wherein said performance metric is established for said machine vision vehicle wheel alignment measurement system as a whole.

6. The method of claim 4 wherein said performance metric is established for at least one of said cameras.

7. The method of claim 4 wherein said performance metric identifies one of a change in a relative position of one of said cameras relative to another of said cameras, a change associated with a component within at least one of said cameras subsequent to said calibration, or a change associated with at least one of said identifiable features of said calibration fixture.

8. A method for evaluating a machine vision vehicle service system having a plurality of camera components disposed to view each side of a vehicle support surface, comprising:

observing a set of optical targets mounted to a fixture with said plurality of camera components to acquire a set of images representative of said observed optical targets, while said fixture is disposed on said vehicle support surface at a position which is within a region of overlapping fields of view associated with said plurality of camera components;

processing said set of images to identity at least one of a defective camera component, a defective optical target and a defect associated with said fixture.

9. A method for establishing coordinate transforms between cameras in a machine vision vehicle wheel alignment measurement system, comprising:

acquiring, from a first camera in a first position and orientation, at least two images of a portion of a fixture positioned in at least two different locations within the field of view of the first camera, at least one of said images acquired with said fixture positioned on a surface within a region of overlapping fields of view of said first camera and a second camera;

acquiring, from said second camera in a second position and orientation, at least two images of said portion of said fixture positioned in at least two different locations within the field of view of the second camera, at least one of said images acquired with said portion of said fixture positioned on said surface within said region of overlapping fields of view of said first camera and said second camera;

processing said set of acquired images from each of said cameras to establish a coordinate transform between reference frames of the first camera in said first position and orientation and said second camera in said second position and orientation;

wherein said first camera is a front camera having a field of view disposed to view a front wheel of a vehicle disposed on said surface;

wherein said second camera is a rear camera having a field of view disposed to view a rear wheel of said vehicle on said same side as said front wheel; and wherein said front and rear cameras are secured in a fixed relationship laterally offset from, and longitudinally in front of, said surface.

10. The method of claim 9 wherein said portion of said fixture includes an optical target.

11. The method of claim 9 further including the steps of:

acquiring, from a third camera in a third position and orientation, at least two images of a second portion of said fixture positioned on said surface within a field of view of the third camera, at least one of said images acquired with said second portion of said fixture positioned on said surface within a region of overlapping fields of view of said third camera and a fourth camera;

acquiring, from said fourth camera in a fourth position and orientation, at least two images of said second portion of said fixture positioned on said surface within the field of view of the fourth camera, at least one of said images acquired with said second portion of said fixture positioned on said surface within said region of overlapping fields of view of said third camera and said fourth camera; and processing said set of acquired images from said third and fourth cameras to establish a coordinate transform between reference frames of the third and fourth cameras.

12. The method of claim 11 wherein said third camera is a front camera having a field of view disposed to view a front wheel of a vehicle disposed on an associated support surface on an opposite side of said vehicle from said first camera field of view;

wherein said fourth camera is a rear camera secured in a fixed relationship with said third camera and having a field of view disposed to view a rear wheel of said vehicle on said same side of said vehicle as said third camera field of view; and wherein said third and fourth cameras are laterally offset from said first and second cameras, and are longitudinally in front of, said surface.

13. The method of claim 11 further including the step of processing said set of images from said first and second cameras together with said set of images from said third and fourth cameras to establish coordinate transforms between associated reference frames of said cameras; and wherein said first and second cameras define a first camera assembly disposed to view one side of a vehicle, while said third and fourth cameras define a second camera assembly disposed to view an opposite side of the vehicle.

14. The method of claim 9 wherein said surface is a vehicle support surface;
wherein said fixture is positioned at each of said different locations, on said vehicle support surface during each acquisition step; and
further including the step of processing said acquired sets of images to characterize said vehicle support surface.

15. A method for establishing coordinate transforms between multiple cameras in a machine vision vehicle wheel alignment measurement system viewing portions of a vehicle support surface, comprising:
providing a fixture adapted to receive a machine vision optical target at each opposing end;
disposing said fixture transversely across said vehicle support surface, such that a first optical target disposed at a first opposing end is within the field of view of at least a first camera of the machine vision vehicle wheel alignment measurement system, and a second optical target disposed at a second opposing end is within the field of view of at least a second camera of the machine vision vehicle wheel alignment measurement system, said first and second cameras disposed on opposite sides of a longitudinal centerline of the vehicle support surface;
acquiring, from each camera, at least one image of the optical targets within the respective fields of view;
displacing the first opposing end of the fixture along the vehicle support surface to a next position which is longitudinally offset from said second end, and acquiring from each camera, at least a second image of the optical targets within the respective fields of view;
displacing the second opposing end of the fixture along the vehicle support surface to a subsequent position in the same direction as said displacement of said first end to a next position which is longitudinally offset from said first end, and acquiring from each camera, at least a third image of the optical targets within the respective fields of view; and
processing said acquired images to establish at least a coordinate transform between the first and second cameras.

16. The method of claim 15 further including the step of processing said acquired images to characterize the runway surface.

17. The method of claim 15 wherein said machine vision vehicle wheel alignment measurement system is a four-camera system, including a third camera having a field of view partially overlapping the field of view of said first camera, and a fourth camera having a field of view partially overlapping said field of view of said second camera;
wherein at least one image from each camera is acquired with the first optical disposed target in the overlapping field of view of the first and third cameras, and with the second optical target in the overlapping field of view of the second and fourth cameras; and
wherein said step of processing said images further establishes a coordinate transform between the first and third cameras, and a coordinate transform between the second and fourth cameras.

18. The method of claim 15 further including the step of providing operator guidance for positioning said calibration fixture during said steps of disposing, displacing, and acquiring.

19. The method of claim 15 wherein said set of processing includes establishing a comprehensive characterization data set associated with each of said cameras and said runway from said acquired images.

20. The method of claim 19 wherein said comprehensive characterization data set is optimized to minimize measurement errors associated with each of said cameras.

21. A method for using a machine vision vehicle wheel alignment measurement system having cameras for observing the left and right sides of a vehicle positioned on a vehicle support surface, comprising:
providing a fixture having identifiable features;
placing said fixture at a first position on said vehicle support surface;
acquiring from said cameras, a set of images of said identifiable features of said fixture;
repositioning said fixture to at least one longitudinally displaced position on said vehicle support surface;
acquiring from said cameras, for each repositioning of said fixture, an additional set of images of said identifiable features of said fixture; and
processing said sets of acquired images to generate characterization data for a longitudinal portion of said vehicle support surface over which said longitudinally displaced positions are disposed.

22. The method of claim 21 wherein said characterization data includes height data for a plurality of points on said longitudinal portion of said vehicle support surface.

23. The method of claim 22 wherein said height data represents relative heights between starting and ending positions for each vehicle front tire contact patch during a rolling runout compensation procedure.

24. The method of claim 23 further including the step of comparing said relative heights to an overall runway reference plane to establish a representation of runway quality.

25. The method of claim 21 wherein said characterization data includes altitude data for multiple points along each runway portion of said vehicle support surface.

26. The method of claim 21 wherein said characterization data identifies sloping within said longitudinal portion of the vehicle support surface.

27. The method of claim 21 wherein said characterization data identifies bending along said longitudinal portion of the vehicle support surface.

28. The method of claim 21 wherein said characterization data is utilized to compensate vehicle measurements for runway deviations from level.

29. The method of claim 28 wherein said characterization data is utilized to compensate vehicle measurements for side-to-side deviations in the height of said longitudinal portions of the vehicle support surface on which the left and right wheels of the vehicle are supported.

30. The method of claim 21 further including the step of interpolating characterization data associated with points on said vehicle support surface located between said plurality of positions at which said fixture is disposed.

31. The method of claim 21 wherein said characterization data is utilized to generate a map of the runway surfaces.

* * * * *